United States Patent [19]

Fedor et al.

[11] 4,088,606

[45] * May 9, 1978

[54] COBALT BASE NOX REDUCING CATALYTIC STRUCTURE

[75] Inventors: Robert J. Fedor, Westlake; Cameron S. Ogden, Hudson, both of Ohio

[73] Assignee: Gould Inc., Rolling Meadows, Ill.

[*] Notice: The portion of the term of this patent subsequent to Jul. 13, 1993, has been disclaimed.

[21] Appl. No.: 726,792

[22] Filed: Sep. 27, 1976

Related U.S. Application Data

[63] Continuation of Ser. No. 467,106, May 6, 1974, abandoned, which is a continuation-in-part of Ser. No. 207,525, Dec. 13, 1971, abandoned, which is a continuation-in-part of Ser. No. 149,331, Jun. 2, 1971, abandoned.

[51] Int. Cl.² .......................... B01J 21/04; F01N 3/08
[52] U.S. Cl. ..................... 252/465; 252/470; 252/472; 252/474; 60/274; 60/301; 23/288 F; 75/208 R
[58] Field of Search ............... 423/213.2, 213.5, 239; 60/274, 301; 23/288 F; 252/477, 465, 470–472, 476; 75/134 F, 171, 208 R

[56] References Cited

U.S. PATENT DOCUMENTS

| | | | |
|---|---|---|---|
| 3,399,058 | 8/1968 | Roush | 75/170 |
| 3,546,075 | 12/1970 | Sheetz et al. | 29/191 |
| 3,552,953 | 1/1971 | Lemkey et al. | 75/134 R |
| 3,773,894 | 11/1973 | Bernstein et al. | 423/213.5 |
| 3,969,480 | 7/1976 | Fedor et al. | 423/213.5 |

OTHER PUBLICATIONS

"Chemical Abstracts", vol. 59, p. 13258.

*Primary Examiner*—G. O. Peters
*Attorney, Agent, or Firm*—Russell E. Baumann; Edward E. Sachs

[57] ABSTRACT

A system for reducing $NO_x$ gases found in the exhaust stream of the internal combustion engine is provided which includes an internal combustion engine having associated therewith a means for supplying fuel and oxygen to the engine, a manifold system for directing or channeling the exhaust gases from the engine, and a $NO_x$ reducing catalyst assembly communicating with the manifold which includes a housing having a $NO_x$ reducing catalytic structure of apertured thin metal foil positioned therein which comprises a durable, chromium containing corrosion resistant cobalt base substrate having metallurgically bonded thereto, on at least one surface, an effective amount of a $NO_x$ reducing catalyst selected from the group consisting of iron, nickel, cobalt, copper, manganese and mixtures thereof.

19 Claims, 4 Drawing Figures

COBALT BASE NOX REDUCING CATALYTIC STRUCTURE

BACKGROUND OF THE INVENTION

This is a continuation, of application Ser. No. 467,106 filed May 6, 1974, which is a continuation-in-part of U.S. patent application Ser. No. 207,525, filed Dec. 13, 1971, which, in turn, is a continuation-in-part of U.S. patent application Ser. No. 149,331, filed June 2, 1971 (now abandoned).

This invention relates to a system of operating an internal combustion engine and includes a catalytic structure capable of reducing oxides of nitrogen, especially nitric oxide and nitrogen dioxide (herein collectively referred to as $NO_x$), which are found in the exhaust gases emanating from the internal combustion engine. In addition, it concerns a catalytic structure comprising a durable, corrosion resistant cobalt base substrate having an effective amount of a $NO_x$ reducing catalyst metallurgically bonded thereto. Such a catalytic structure is characterized by its corrosion resistance and is especially effective in reducing the oxides of nitrogen at temperatures of about 1100° F and above.

DESCRIPTION OF THE PRIOR ART

Many undesirable gases are found in the exhaust stream emanating from the internal combustion engine. Some of the most harmful and annoying of these gases are carbon monoxide, unburned hydrocarbons and the oxides of nitrogen.

Presently, much effort is being directed to the removal of carbon monoxide and unburned hydrocarbons by thermal or catalytic oxidation, and to the diminution or elimination of the oxides of nitrogen by catalytic reduction.

With regard to the various oxides of nitrogen, herein referred to as $NO_x$, it is the present desire to eliminate at least 90% of the $NO_x$ issuing from the typical internal combustion engine, using the 1971 U.S.A. model automotive vehicle as the base.

In the prior art, references can be found which concern certain catalysts that are, at least theoretically, capable of reducing $NO_x$ to less harmful substances. However, such prior art is devoid of any reference or teaching which concerns a durable, economical catalyst system which is especially well suited for use in the operating environment associated with today's automobiles.

In the main, this is due to the fact that the present stringent $NO_x$ reduction requirements necessitate the operation of the catalyst in a corrosive atmosphere at unusually high temperatures. For example, under normal operating conditions in a conventional internal combustion engine, such a catalyst is often exposed to temperatures ranging from about 1100° F to 1700° F and higher. Under these operating conditions, it has heretofore been essentially impossible to find a $NO_x$ reducing catalyst which evidences the requisite catalytic efficiency and also possesses the necessary structural durability.

As typical of the prior art, tests have been published indicating that nickel-cooper alloys are very active catalytic $NO_x$ reduction devices. In use, these catalytic devices are formed into Berl saddles to increase the surface area and to provide for a relatively low pressure catalyst containing assembly. However, in actual operation, experience has indicated that nickel-copper alloys have an oxidation limit of about 1300° F, or slightly higher, whereas present day internal combustion engines have an efflux temperature, during some part of the normal operating cycle, of up to about 1900° F. Such high temperatures cause a rapid deterioration of the catalyst and substantially reduce its effective life span. Furthermore, the preferred structure of prior art devices, such as the saddles mentioned above, are caused at high temperatures to be sintered together to a point where eventually significant gas blockage occurs. Thus, while copper-nickel alloys are sufficiently active in reducing up to 90% of the $NO_x$ present, they are impractical at this time due to a lack of durability.

An extensive analysis of various catalytic structures, and the problems pertaining thereto, was published by the Society of Automotive Engineers on July 11, 1971, in SAE Paper No. 710291, entitled "$NO_x$ Reduction Catalysts for Vehicle Emission Control". This article includes the disclosure of a composite of copper and stainless steel in the form of wire mesh screen. Still other approaches are indicated in U.S. Pat. No. 3,565,,574 and British Pat. No. 1,058,706. The latter discloses a ceramic substrate and is thus representative of a catalyst in which the activating, or $NO_x$ reducing material, does not withstand high temperatures by itself but must be supported by a suitable substrate.

In general, it may be summarized that presently known catalyst structures have failed to provide the required degree of $NO_x$ reduction due to a lack of structural rigidity at high temperatures, insufficient corrosion resistance, back pressure build up due to agglomeration, spalling of the catalytically active surface, or a combination of any or all of these shortcomings.

The instant invention overcomes the hereinbefore set forth types of problems associated with prior art devices by providing a system for operating an internal combustion engine which includes the use of a durable, efficient $NO_x$ reducing catalytic structure comprising a corrosion resistant, substrate having an effective amount of a suitable $NO_x$ reduction catalyst metallurgically bonded thereto.

SUMMARY OF THE INVENTION

According to one aspect of the invention, a system for reducing $NO_x$ gases found in the exhaust stream of the internal combustion engine is provided which includes an internal combustion engine having associated therewith a means for supplying fuel and oxygen to the engine, a manifold system for directing or channeling the exhaust gases from the engine, and a $NO_x$ reducing catalyst assembly communicating with the manifold which includes a housing having a $NO_x$ reducing catalytic structure of apertured thin metal foil positioned therein which comprises a durable, corrosion resistant chromium containing cobalt base substrate having on at least one surface, an effective amount of a $NO_x$ reducing catalyst selected from the group consisting of iron, nickel, cobalt, copper, manganese and mixtures thereof.

According to another aspect, the present invention is accomplished by providing a $NO_x$ reducing catalytic structure comprising a durable, corrosion resistant cobalt base support or substrate having an effective amount of a $NO_x$ reducing catalyst metallurgically bonded thereto.

As used herein the term "cobalt base substrate" shall mean a substrate wherein the weight percent of cobalt always exceeds the individual weight percent by any other filler material, viz., nickel and/or iron.

As used herein the term "metallurgically bonded" shall mean bonded together by the formation of a localized alloy.

More specifically, the catalytic structure of the instant invention comprises a chromium containing cobalt base substrate, which may also optionally contain comparatively minor amounts of iron and/or nickel, having a $NO_x$ reducing catalyst metallurgically bonded to at least one surface of the substrate. In this system, chromium is an oxide former and imparts corrosion resistance to the substrate. In a binary cobalt base system, the cobalt content of the substrate can range from about 50 to about 85 weight percent, with the remainder being essentially chromium. However, if it is desired for operational or economic reasons, some of the cobalt can be replaced with iron and/or nickel. In fact, under certain conditions, it may be desirable to form the substrate from iron or nickel base alloys. See commonly assigned U.S. patent applications, Ser. Nos. 207,284; 207,337; 207,303 and 207,281, entitled Nickel Base $NO_x$ Reducing Catalytic Structure, Self-Supporting $NO_x$ Reducing Catalyst, Chromium Containing Iron Base $NO_x$ Reducing Catalytic Structure and Aluminum Containing Iron Base $NO_x$ Reducing Catalytic Structure, respectively, filed Dec. 13, 1971.

In a cobalt base system, up to 40 weight percent of nickel or iron can be added to substrate composition with the only additional limitation being that the individual weight percent of both nickel and iron is less than the weight percent of cobalt. In the system where iron and/or nickel are substituted for part of the cobalt, the minimum cobalt content is about 17 weight percent of the substrate. In addition, aluminum can be substituted for some of the chromium. Specifically, from a trace amount up to about 10 weight percent of aluminum can be included in the substrate composition of the invention. However, when aluminum is substituted for some of the chromium, the total weight percent of aluminum plus chromium cannot exceed about 50 weight percent.

The type and amount of $NO_x$ reducing catalyst which may be metallurgically bonded to the hereinbefore described substrate depends to a large degree on the environment in which the catalytic structure will be utilized. In exhaust gases emanating from the internal combustion engine, $NO_x$ catalysts selected from the group consisting of nickel, iron, cobalt, manganese, copper and mixtures thereof have been found to be especially effective. The main criteria for a suitable $NO_x$ catalyst is that (1) it does not deleteriously react with the substrate and (2) it is effective in reducing $NO_x$ gases at the temperature of intended use.

With regard to the effectiveness of the $NO_x$ catalyst, it should be pointed out that when using the hereinbefore described substrate, care should be taken to avoid or minimize the migration of chromium and/or aluminum to the surface of the $NO_x$ catalyst, as such substances reduce catalyst efficiency. From a practical standpoint, when operating at temperatures ranging from about 1100° F to about 1700° F, i.e., at temperatures usually experienced in today's automobiles, the individual chromium and aluminum content on the surface of the $NO_x$ catalyst should be less than about 15 and 4 weight percent, respectively. However, it should be pointed out here that when operating at higher temperatures and/or under different air to fuel ratios, it may be possible to tolerate a slightly higher weight percentage of chromium and/or aluminum on the surface of the catalytic layer and still have an efficient catalytic system.

For clarity sake, as used herein the term "surface of the catalytic layer" shall mean the volume defined by the area covered by the catalytic material taken to the depth measurable by a 20,000 volt microprobe, i.e., approximately 50 to 80 microinches in depth.

After the catalytic layer has been metallurgically bonded to the substrate, the catalytic layer can be differentiated from the substrate by the amount and distribution of chromium and/or aluminum (oxide formers) found in these respective sections of the resultant catalytic structure. In a system wherein the only oxide former used is chromium, as before noted, the amount of chromium present in the substrate can range from about 15 to about 50 weight percent. In the resultant catalytic structure, in weight percent, there usually is less chromium (oxide former) in the catalytic layer than in the substrate proper. In actual practice there is a gradient of chromium throughout the catalytic structure ranging from a point of maximum concentration in the substrate (at least 15 weight percent chromium) to a point of relatively low concentration in the catalytic layer (not greater than 15 weight percent at the surface of the catalyst zone). That is, the surface of the catalytic layer usually contains a lower weight percent of chromium than does the substrate. Stating it functionally, the substrate contains enough chromium to render it resistant to corrosion, whereas the catalyst layer contains none or minimum amounts of chromium so as to not impair its ability to function as a $NO_x$ reducing catalyst.

By utilizing the teaching of the instant invention, it is possible to obtain a $NO_x$ reducing catalytic structure which is highly efficient and exceptionally durable, i.e., resistant to attrition and corrosion.

Accordingly, a major object of the invention is to provide a system for catalytically reducing $NO_x$ found in the exhaust gases of the internal combustion engine.

A further object of the invention is to provide a catalytic structure which combines high $NO_x$ reducing activity with high structural stability and which is especially effective at the level of elevated temperatures normally experienced in the exhaust gases of the internal combustion engine.

Other objects and the means of accomplishing them will be apparent to those skilled in the art from the following description and claims.

BRIEF DESCRIPTION OF THE DRAWINGS

In the above-identified drawings like parts are indicated by like numerals. Specifically, in FIG. 1 is shown an expanded metal foil catalytic structure 10 comprised of a plurality of strands 12 which define apertures 14; in FIG. 2 the strands 12 and apertures 14 defined thereby, are shown in an enlarged manner; in FIG. 3 a cross-sectional view of the strands 12 is shown.

In FIG. 4 there is shown the system of the invention for catalytically reducing $NO_x$ found in the exhaust stream of the internal combustion engine which system includes an internal combustion engine 20 having communicating therewith a source of fuel 22 and a source 24 of an oxidant (oxygen from air) for the fuel. During operation of the internal combustion engine 20 exhaust gases are generated which pass through the manifold or conduit 26 into the $NO_x$ reducing catalyst assembly or apparatus 28 which includes a housing 30 having a $NO_x$ reducing catalyst structure 32 composed of a sheet of expanded thin metal foil of the type and composition described herein with a suitable nickel-copper $NO_x$ reducing catalyst material deposited on the surface thereof positioned therein. The exhaust gases, after $NO_x$ reduction, then exit from port 34. The so-treated gases are characterized by the fact that a significant amount of $NO_x$ has been removed therefrom.

Figure 1:
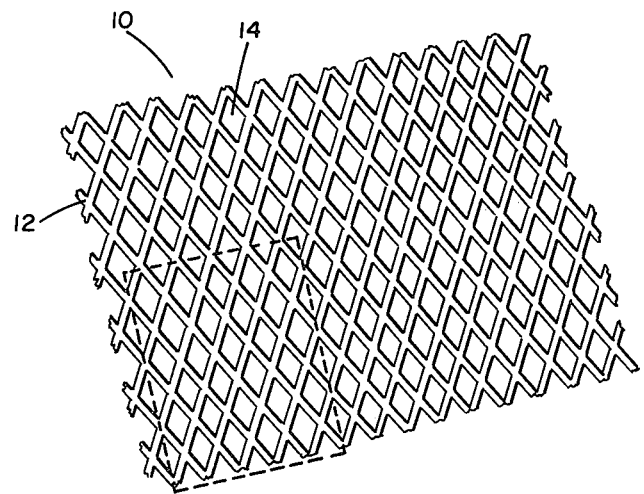
FIG. 1 is a plan view of the catalytic structure of the invention in the form of a sheet of expanded metal foil.
Figure 2:
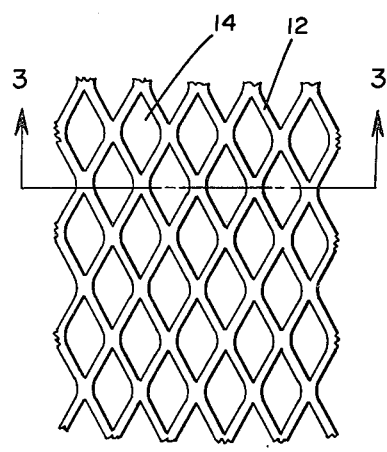
FIG. 2 is an enlarged plan view of the rectangular area of the catalytic structure shown in FIG. 1.
Figure 3:
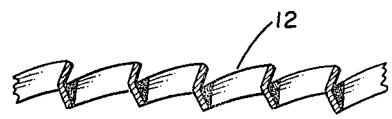
FIG. 3 is a cross-sectional view taken along line 3—3 of FIG. 2 of the catalytic structure of the invention.

In the dual bed system, after the $NO_x$ reduction treatment, the exhaust gases are then brought into contact with an oxidation catalyst to remove carbon monoxide and gaseous hydrocarbons therefrom. As such oxidation catalysts are well known in the art they will not be discussed herein in detail.

DESCRIPTION OF THE PREFERRED EMBODIMENTS OF THE INVENTION

In the preferred embodiment of the invention, the herein described catalytic structure is formed from an expanded metal foil which, in turn, is stamped or otherwise fashioned into a suitable configuration, such as a disc, helical coil, corrugated strip, or the like, to provide a high surface, low mass catalyst assembly.

The catalytic structure of the invention is physically composed of a plurality of different zones or regions comprising a corrosion resistant substrate and a $NO_x$ reducing catalyst layer metallurgically bonded thereto with the chemical composition of the substrate being different that the chemical composition of the catalytic layer. The invention is best explained by the following preferred process sequence for making a chromium containing cobalt base substrate having a copper and/or nickel, $NO_x$ catalyst metallurgically bonded thereto.

The starting material is a conventional electroplated cobalt foil produced continuously on a drum. Optionally, it is annealed in a furnace at a suitable temperature and thereafter expanded to provide an apertured metal structure having a thickness of less than 10 mils. The annealing step facilitates the expanding operation only and appears to be otherwise not necessary. As the expanding process is well known, it will not be described herein in detail.

The expanded cobalt foil is then placed into a suitable, electrically conductive bath to uniformly electrodeposit thereon commercially pure chromium. The amount of chromium deposited is so controlled that chromium will constitute about 15 to about 50 weight percent of the resultant substrate. It has been found that a substrate having a chromium content of less than about 15 weight percent, depending on the operational characteristics of the engine in which it is to be used, does not provide enough high temperature corrosion resistance. Also, data has indicated that exceeding the upper range of chromium content imparts poor formability to the resultant structure.

The constituent materials of the apertured substrate, which are still predominantly in elemental form at this point, are alloyed by a thermal diffusion process which occurs in a furnace at about 2200° F under suitable conditions.

The resulting metallurgical make-up of the substrate can range from a completely homogeneous cobalt-chromium alloy to one wherein the concentration of chromium continuously decreases as the center of the substrate is approached. In practice, the actual type of alloy obtained will depend on such parameters as starting foil thickness and time and temperature of the alloying process. Usually, a homogeneous alloy is utilized.

The above-described structure constitutes the substrate to which a highly active $NO_x$ reducing material is metallurgically bonded. Catalytic materials suitable for this purpose are copper, nickel, iron, cobalt, manganese and alloys thereof. Recent test data has shown that a catalytic layer consisting of about 80 weight percent nickel and 20 weight percent copper is especially effective in reducing $NO_x$ to less harmful substances. The before mentioned catalytic materials are metallurgically bonded to the substrate in such a manner that little, if any, of the catalytic material migrates into the substrate or intermediate zone. In practice, any catalytic material which actually migrates into the substrate proper does not significantly affect the chemical and physical properties of the substrate and is not considered as part of the substrate proper. Generally, the catalyst layer constitutes from about 0.5 to about 50 weight percent of the resultant catalytic structure. However, in use all that is required is that an effective amount of catalyst be present.

In the herein described embodiment of the invention, nickel and/or copper, if desired, is electroplated upon the substrate and subsequently metallurgically bonded thereto by diffusion thereby establishing an outer catalytic zone or layer and an intermediate zone essentially defined by the substrate. The diffusion treatment causes part of the chromium in the substrate to migrate toward and into the outer zone or catalytic layer. Microprobe tests have determined that varying amounts of up to 15 weight percent chromium can be present on the surface of the catalytic layer without seriously affecting its operability at temperatures ranging from about 1100° F to about 1700° F. The exact upper limit of the permissible chromium content in the outer zone, and particularly on the surface thereof, under all circumstances is not yet known.

The catalytic structure of the instant invention comprises a cobalt base substrate which supports or carries the $NO_x$ reducing catalyst. The following table shows substrate compositions which fall within the scope of the instant invention.

| Substrate Component | Element | Range (In Weight Per Cent of Substrate) |
|---|---|---|
| Base | Cobalt | 17 to 85 |
| Base Substitute | Nickel* | 0 to 40 |
| Base Substitute | Iron* | 0 to 40 |
| Oxide Former | Chromium** | 5 to 50 |
| Oxide Former | Aluminum** | 0 to 10 |

*the weight percent of both nickel and iron, if present, is less than the weight percent of cobalt
**when both chromium and aluminum are present the weight percent of chromium plus aluminum cannot exceed 50

In the preferred practice of the system of the invention the internal combustion engine is operated in a manner such that the exhaust gases therefrom contain relatively low amounts of unreacted oxygen. Preferably less than 1 volume percent of unreacted oxygen is present. Usually, this is accomplished by operating the engine with an air/fuel ratio on the rich side of stoichiometric (rich referring to excess fuel) which is primarily achieved by adjusting the carburetion setting. It is also contemplated to utilize fuel injection as well as other conventional means to supply the engine with the necessary amounts of fuel and oxidant therefor. In the preferred practice of the system of the instant invention it is generally desirable to operate the internal combustion engine in a manner such that the air/fuel ratio generally ranges from about 13.8 to 1 to about 14.5 to 1. However, it will be appreciated by those skilled in the art that depending on the specific fuel utilized, the type of catalyst employed and the temperature at which the gases contact the concerned catalyst this ratio may vary slightly. In general, it can be stated that the ratio of carbon monoxide to oxygen found in the exhaust gas should range from about two to one to about six to one. Clearly, a net reducing atmosphere is to be provided.

The following examples of the invention are for illustrative purposes only and are not intended to limit the scope of the invention.

EXAMPLE 1

A sheet of electrodeposited cobalt foil having a thickness of about 0.005 inches is expanded by conventional techniques to produce an open mesh expanded structure having a strand width of about 0.010 inches and about 10 holes per inch. This sheet of expanded cobalt foil is then electroplated with chromium until a 20 percent increase in weight was achieved. Subsequently, the chromium is alloyed with the cobalt foil by heating the so-coated expanded foil structure at sub-atmospheric pressures (½ atmosphere of argon) at a temperature of about 2200° F for a period of about 2 hours. The composition of the resulting substrate is about 80 percent cobalt and 20 weight percent chromium. The complete surface of the so-produced substrate is then electroplated with copper to provide a coating thickness of about 0.0002 inches. The copper is then diffusion bonded to the substrate by heating the copper coated article at sub-atmospheric pressure (½ atmosphere of argon) to a temperature of about 1900° F for about 2 hours.

An analysis of the resultant catalytic structure shows that the surface of the catalytic layer contains about 3 weight percent chromium, about 15 weight percent cobalt, with the balance copper and that the catalytic layer constitutes about 6 weight percent of the catalytic structure.

EXAMPLE 2

A catalytic structure is produced as described in Example 1 except that:
(1) the open mesh, expan-ed cobalt base structure has a strand width of 0.015 inches, and
(2) the resultant structure of Example 1 is provided electrolytically with a 0.0002 inch thick coating of nickel which is diffused into the catalytic structure by heating it in a reduced atmosphere (½ atmosphere of argon) at 1900° F for 2 hours.

An analysis of the resultant catalytic structure shows that the surface of the catalytic layer contains about 10 weight percent chromium, 49 weight percent nickel and 41 weight percent cooper and that the catalytic layer constitutes about 12 weight percent of the catalytic structure.

EXAMPLE 3

A catalytic structure is produced as described in Example 2 except that:

(1) The thickness of the electrodeposited cobalt foil is 0.002 inches, and
(2) The catalyst layer consisted of nickel which is applied to the substrate by electroplating a 0.001 inch thick layer of nickel on all surfaces of the substrate and then metallurgically bonding the catalytic layer and substrate together by heating the composite structure at 1900° F for 2 hours at sub-atmospheric pressure (½ atmosphere argon).

An analysis of the resultant catalytic structure shows that the surface of the catalytic layer consists of essentially 100 weight percent nickel and that it constitutes about 45 weight percent of the catalytic structure.

EXAMPLE 4

A sheet of electrodeposited cobalt foil having a thickness of about 0.004 inches is expanded by conventional techniques to produce an open mesh expanded structure having a strand width of about 0.015 inches and about 10 holes per inch. This sheet of expanded cobalt foil is then electroplated on all of its surfaces with a 0.001 inch thick layer of nickel. The nickel is then diffused into the cobalt foil by heating to a temperature of about 2200° F for about 2 hours under sub-atmospheric conditions (½ atmosphere of argon). Subsequently, this sheet of expanded cobalt-nickel foil is then electroplated with chromium until a 20 percent increase in weight in achieved. The chromium is alloyed with the cobalt nickel foil by heating the so-coated expanded foil metal structure in a one-half atmosphere of argon at a temperature of about 2200° F for a period of about 2 hours. The chemical composition of the resulting substrate is about 53 weight percent cobalt, about 27 weight percent nickel and about 20 weight percent chromium. The complete surface of the so-produced substrate is then electroplated with nickel to provide a coating thickness of about 0.001 inches. The nickel is then diffusion bonded to the substrate by heating the nickel-coated article at reduced pressure (½ atmosphere of argon) to a temperature of about 1900° F for about 2 hours.

The catalytic layer on the resultant catalytic structure is similar in type to that described in Example 3. However, in the present example the catalytic layer constitutes about 21 weight percent of the catalytic structure, with the remainder being the substrate.

EXAMPLE 5

A sheet of electrodeposited iron having a thickness of about 0.001 inch is expanded by conventional techniques to produce an open mesh structure having a strand width of about 0.015 inches and 10 holes per inch. This sheet of expanded iron foil is then electroplated with a 0.001 inch layer of cobalt. The cobalt is then diffused into the iron foil by heating in a sub-atmosphere at a temperature of about 2200° F for about 2 hours. The so-produced cobalt-iron structure is electroplated with chromium until a 20 percent increase in weight is achieved. Subsequently, the chromium is alloyed with the cobalt-iron structure by heating in a ½ atmosphere of argon at a temperature of about 2200° F for a period of about 2 hours. The resulting substrate composition is about 25 percent iron, about 55 percent cobalt and about 20 percent chromium. The complete surface of the so-produced substrate is electroplated with a layer of nickel 0.001 of an inch thick. The nickel catalytic material is then diffusion bonded to the substrate by heating the resultant structure at a reduced pressure of about ½ atmosphere of argon to a temperature of about 1900° F for a period of about 2 hours.

The catalytic layer on the resultant structure is similar in type to that described in Example 3. However, in the present Example, the catalytic layer constitutes about 36 weight percent of the catalytic structure.

EXAMPLE 6

A catalytic structure is produced as described in Example 5 above except that after the cobalt is electroplated on the iron base, a 0.0005 inch thick coating of nickel is plated on the cobalt-iron base structure and subsequently alloyed therewith by heating in a reduced atmosphere to a temperature of 2200° F for a period of about 2 hours.

The composition of the substrate produced as above described is about 41 weight percent cobalt, about 18 weight percent iron, about 21 weight percent nickel and about 20 weight percent chromium.

The catalytic layer on the resultant catalytic is similar in type to that described in Example 3. However, in the instant example, the catalytic layer constitutes about 29 weight percent of the catalytic structure.

EXAMPLE 7

A catalytic structure is produced as described in the Example 6 above, except that after the chromium is diffused into the cobalt-iron structure, 0.0003 inches of aluminum are vapor plated on all of the surfaces thereof and then diffused therein by heating in a reduced atmosphere at a temperature of about 1900° F for about 8 hours. The composition of the above-described substrate is about 40 weight percent cobalt, 20 weight percent nickel, 17 weight percent iron, 19 weight percent chromium and 4 weight percent aluminum.

An analysis of the resultant catalytic structure showed that the catalytic layer constituted about 28 weight percent of the catalytic structure.

With regard to catalytic structures of the foregoing type, recent data indicates that they exhibit remarkably superior performance characteristics with respect to reduction of $NO_x$ when compared to other known $NO_x$ reducing catalytic structures. At this time, the exact mechanism which makes these results possible is not yet completely understood. It may reside in the chemistry of the system, the use of expanded metal foil, the interaction of the materials, or a combination thereof.

Figure 4:
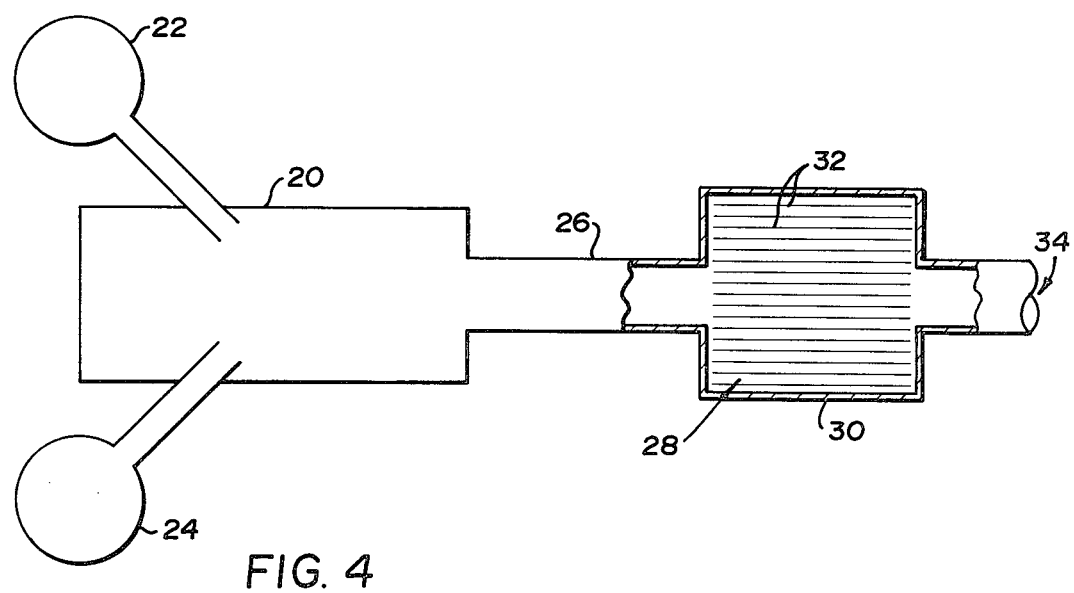
FIG. 4 is a diagrammatical illustration of the system of the invention.

Catalysts of the type described herein are utilized in a system for operating an internal combustion engine (as described relative to FIG. 4) with a high degree of success. Such a system when used in conjunction with a conventional oxidation catalyst provides an ideal method for reducing $NO_x$, carbon monoxide and unburned hydrocarbon content of automotive exhaust gases.

While the discussion herein has, in the main, concerned an open mesh substrate structure obtained by exanding metal, it will be readily appreciated by those skilled in the art that an open mesh structure can also be achieved by such techniques as slip casting, roll forming, perforating metal sheet, direct electroplating of an open mesh structure, joining strands of fibers together and the like.

As can be seen from a review of the foregoing, the instant invention concerns an article for reducing the $NO_x$ content of the exhaust gas stream emanating from the internal combustion engine and a method of using such an article which comprises bringing the exhaust gas stream into contact with a $NO_x$ reducing structure of the type herein described which includes an oxidation resistant substrate having an effective amount of a $NO_x$ reducing catalyst on the surface thereof.

While there have been described what are at present considered to be the preferred embodiments of this invention, it will be obvious to those skilled in the art that various changes and modifications may be made therein without departing from the spirit and scope of the invention as hereinafter claimed.

What is claimed is:

1. A catalytic structure capable of catalyzing the reduction of $NO_x$ gases found in the exhaust stream of an internal combustion engine which is obtained by:
   (a) forming an expanded metal foil substrate of constituents comprising:
      (i) from about 50 to about 85 weight percent of a metal selected from the group consisting of cobalt, a mixture of cobalt and iron, a mixture of cobalt and nickel, and a mixture of cobalt, nickel and iron, with cobalt always being present in an amount equal to a least about 17 weight percent of the substrate and the weight percent of iron and nickel individually never exceeding about 40 percent and always being less than the weight percent of cobalt; and
      (ii) from about 15 to about 50 weight percent of a metal selected from the group consisting of chromium, aluminum and mixtures thereof with at least about 5 weight percent of chromium always present in the substrate and the amount of aluminum never exceeding about 10 weight percent; and
   (b) metallurgically bonding an effective amount of a $NO_x$ reducing catalyst to at least one surface of said substrate to form a catalytic layer thereon in such a manner that the chemical composition of the substrate is different than the chemical composition of the catalytic layer.

2. The catalytic structure of claim 1 wherein said substrate consists essentially of about 80 weight percent cobalt and about 20 weight percent chromium.

3. The catalytic structure of claim 1 wherein said catalytic layer comprises a metal selected from the group consisting of nickel, cobalt, iron, manganese, copper and mixtures thereof.

4. The catalytic structure of claim 2 wherein said catalytic layer is a metal selected from the group consisting of nickel, cobalt, iron, manganese, copper and mixtures thereof.

5. The catalytic structure of claim 3 wherein said catalytic layer consists essentially of about 80 weight percent nickel and about 20 weight percent copper.

6. The catalytic structure of claim 5 wherein said catalytic layer consists essentially of about 80 weight percent nickel and about 20 weight percent copper.

7. The catalytic structure of claim 1 wherein said expanded metal foil has a thickness of less than about 0.010 inches.

8. The catalytic structure of claim 1 wherein said catalytic layer constitutes from about 0.5 weight percent to about 50 weight percent of said catalytic structure.

9. The catalytic structure of claim 1 wherein the weight percent of chromium on the surface of the catalytic layer is less than the weight percent of chromium in the substrate.

10. In the combination commprising an internal combustion engine and a catalyst for catalytically reducing nitrogen oxides in the exhaust gases of said engine, the improvement wherein said catalyst comprises a thin expanded metal foil structure comprising a corrosion resistant cobalt base substrate having an effective amount of $NO_x$ reducing catalyst metallurgically bonded on the surface thereof, said cobalt base substrate before metallurgical bonding of said $NO_x$ catalyst comprising:

from about 50 to about 85 weight percent of a metal selected from the group consisting of cobalt, a mixture of cobalt and iron, a mixture of cobalt and nickel, and a mixture of cobalt, nickel, and iron, with cobalt always being present in an amount equal to at least about 17 weight percent of the substrate and the weight percent of iron and nickel individually never exceeding about 40 percent and always being less than the weight percent of cobalt; and from about 15 to about 50 weight percent of a metal selected from the group consisting of chromium, aluminum and mixtures thereof with a least about 5 weight percent of chromium always present in the substrate and the amount of aluminum never exceeding about 10 weight percent:

the chemical composition of the catalytic layer being different than the chemical composition of said substrate.

11. The combination of claim 10 wherein said $NO_x$ reducing catalyst comprises a metal selected from the group consisting of nickel, cobalt, iron, manganese, copper and mixtures thereof.

12. The combination of claim 10 wherein said $NO_x$ reducing catalyst is an alloy of copper and nickel.

13. The combination of claim 12 wherein said $NO_x$ reducing catalyst consists essentially of 80 weight percent nickel and 20 weight percent copper.

14. The combination of claim 11 wherein said expanded thin metal has a thickness of less than about 0.010 inches.

15. The combination of claim 10 wherein said catalytic layer constitutes from about 0.5 weight percent to about 50 weight percent of said catalytic structure.

16. The combination of claim 10 wherein the surface of said catalytic layer contains less than 15 weight percent of chromium.

17. The combination of claim 12 wherein the weight percent of chromium on the surface of the catalytic layer is less than the weight percent of chromium in the substrate.

18. The combination of claim 16 wherein said chromium is present as a gradient of concentrations, the concentration in said substrate being a maximum and the concentration in said surface being essentially zero.

19. The catalytic structure of claim 3 wherein said catalytic layer consists essentially of an alloy of nickel and copper.

* * * * *